(12) United States Patent  (10) Patent No.: US 6,698,680 B2
Kato  (45) Date of Patent: Mar. 2, 2004

(54) MAGNETIC RECORDING MEDIUM WINDING APPARATUS AND MAGNETIC RECORDING MEDIUM WINDING METHOD

(75) Inventor: Shigemi Kato, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/242,722

(22) Filed: Sep. 13, 2002

(65) Prior Publication Data
US 2003/0052217 A1 Mar. 20, 2003

(30) Foreign Application Priority Data
Sep. 14, 2001 (JP) .................................... P. 2001-279638

(51) Int. Cl.⁷ .............................................. B65H 18/08
(52) U.S. Cl. ...................................... 242/534; 242/547
(58) Field of Search .................. 242/357, 534, 242/547

(56) References Cited

U.S. PATENT DOCUMENTS 5,518,201 A * 5/1996 Hagens et al. ............... 242/547

* cited by examiner

Primary Examiner—John Q. Nguyen
(74) Attorney, Agent, or Firm—Sughrue Mion, PLLC

(57) ABSTRACT

A magnetic recording medium winding apparatus for rolling up an original roll of the magnetic recording medium, comprising: an arm member rotatably supporting a pushing roller at one end side thereof and supported turnably around the other end side thereof; a driving unit turning the arm member to push the pushing roller against the original roll of magnetic recording medium at a predetermined set pressure while rolling up the original roll; a strain sensing unit sensing a strain generated in the arm member during a pushing by the driving unit; and a control unit calculating a pressure of the pushing roller against the original roll of magnetic recording medium based on a sensed signal of the strain sensing unit and also feedback-controlling the driving unit such that the calculated pressure coincides with the set pressure at the driving unit.

5 Claims, 4 Drawing Sheets

MAGNETIC RECORDING MEDIUM WINDING APPARATUS AND MAGNETIC RECORDING MEDIUM WINDING METHOD

BACKGROUND OF THE INVENTION

The present invention relates to a magnetic recording medium winding apparatus for winding a magnetic recording medium, etc.

In steps of manufacturing the magnetic recording medium such as the magnetic tape, etc., the magnetic recording medium is wound by the magnetic recording medium winding apparatus like a roll to feed the magnetic recording medium to next steps when processes in respective steps are completed. In this case, the thinner thickness and the higher density of the recent magnetic recording medium are advanced, such medium is formed as a very thin layer such that a total thickness is about 5 μm, and the surface property of the medium is also improved. Therefore, the failure during the winding of the magnetic recording medium becomes the big problem.

First, if the exclusion of the air between the magnetic recording mediums is not sufficient when the magnetic recording medium is wound like a roll, the so-called "loose winding" of the original roll of magnetic recording medium is caused. Thus, the winding mode is not stable, and the magnetic recording medium cannot be supplied stably to the next step. Since the magnetic recording mediums slides easily if the surface property of the magnetic recording mediums is better, this problem becomes prominent. Also, if a large amount of the air still remains in the original roll of magnetic recording medium, the air is released with the lapse of time. Thus, there is caused the problem such than the magnetic recording medium is folded in the space, from which the air is released, to generate the wrinkle.

Therefore, in order to prevent the "loose winding", it may be considered that, when the magnetic recording medium is wound while pushing the magnetic recording medium against the original roll of magnetic recording medium by the pushing roller, or the like, the pushing pressure is increased. However, if the exclusion of the air in the inside of the original roll of magnetic recording medium is executed excessively, the large stress is loaded onto the magnetic recording medium. Therefore, the magnetic recording medium made of elastic material such as PET, or the like, for example, is deformed during the winding, and thus sometimes the wrinkle is generated during the winding. In this manner, there is the problem how to adjust the setting of the air since the adjustment of the exclusion of the air is delicate.

Also, the magnetic recording medium is subjected to various tensions in the winding and in respective steps up to now and is distorted. Thus, if the magnetic recording medium is employed as it is, the residual strain brings about the defective quality such as the skew, etc. and the defective process in which the wrinkle is generated in the inside of the original roll of magnetic recording medium in the peripheral direction and the width direction after the winding has been completed. For this reason, sometimes there is applied the strain removing step in which the strain is removed by applying the annealing process for several hours or several days after the winding. In this case, if the strain is removed, the magnetic recording medium is shrunk and is deformed to reduce a diameter of the original roll of magnetic recording medium. In this case, if the air exists by a predetermined amount in the original roll of magnetic recording medium, the magnetic recording medium can be shrunk because the air is excluded. Unless the air does not exist by the predetermined amount, the magnetic recording medium cannot be shrunk, so that the strain cannot be removed.

In addition, if the pushing force of the pushing roller is increased, the residual air amount in the original roll of magnetic recording medium can be reduced, so that the magnetic recording medium can be wound tightly. However, if the magnetic recording medium is a thin layer, the tension must be lowered in view of the thickness and the strength of the magnetic recording medium. If the winding is executed while lowering the tension, the exclusion of the air in the original roll of magnetic recording medium is not carried out successively. Thus, the above defective process appears frequently, and the failures such as the so-called rough winding, in which the unevenness is generated on the side surfaces, the loose winding, etc. are generated.

In this manner, if the residual air amount contained in the original roll of magnetic recording medium is set too large or too small, the failure is caused. Therefore, the air amount that enters into the inside of the original roll of magnetic recording medium during the winding of the magnetic recording medium is adjusted by adjusting the pushing force of the pushing roller against the original roll of magnetic recording medium.

As one adjusting approach, as shown in FIG. 6, there is the method of pushing the pushing roller 25 against the original roll of magnetic recording medium 23 during the winding and then adjusting the air amount that is sandwiched between respective layers of the original roll of magnetic recording medium 23 by the pushing roller 25. This pushing roller 25 is fitted rotatably to the top end of the arm member 55 that is turned around the rotation shaft 53. Then, the gear portion 63 of the arm member 55 is driven by moving upward and downward the rack 61, which is provided to the side surface of the piston rod 59, by virtue of the air cylinder 57. Therefore, the arm member 55 is turned around the rotation shaft 53 to push the pushing roller 25 against the original roll of magnetic recording medium 23.

However, in the above magnetic recording medium winding apparatus 51, as shown in FIG. 7, because of the influences of the sliding resistance of the sliding surface 65 between the piston rod 59 and the air cylinder 57, the resistance between the piston rod 59 and the gear portions 61, 63, the variation in the fitting precision of respective portions, etc., the pushing pressure of the pushing roller 25 against the original roll of magnetic recording medium 23 does not coincide with the set pressure. Thus, it is difficult to set precisely the actual pushing pressure.

Also, the conditions such as the pressure that causes the wrinkle in the magnetic recording medium, etc. are not fixed constant because of the above influences, and the individual difference appears in the employed magnetic recording medium winding apparatuses 51. Therefore, the winding conditions must be set individually in each magnetic recording medium winding apparatus 51, which makes the manufacturing steps complicated and causes the increase in cost.

SUMMARY OF THE INVENTION

The present invention has been made in view of such problems in the prior art, and it is an object of the present invention to provide a magnetic recording medium winding apparatus capable of setting precisely a pushing force of a pushing roller against an original roll of magnetic recording medium and particularly capable of winding stably a thin magnetic recording medium, to which a pressure must be applied delicately, in high quality.

In order to achieve the above object, according to a first aspect of the present invention, there is provided a magnetic recording medium winding apparatus for rolling up an original roll of the magnetic recording medium, comprising: an arm member rotatably supporting a pushing roller at one end side thereof and supported turnably around the other end side thereof; a driving unit turning the arm member to push the pushing roller against the original roll of magnetic recording medium at a predetermined set pressure while rolling up the original roll; a strain sensing unit sensing a strain generated in the arm member during a pushing by the driving unit; and a control unit calculating a pressure of the pushing roller against the original roll of magnetic recording medium based on a sensed signal of the strain sensing unit and also feedback-controlling the driving unit such that the calculated pressure coincides with the set pressure at the driving unit.

According to a second aspect of the present invention, there is provided a magnetic recording medium winding apparatus as set forth in the first aspect, wherein the magnetic recording medium is magnetic tape.

According to a third aspect of the present invention, there is provided a magnetic recording medium winding apparatus as set forth in the first aspect, wherein the arm member comprises a sectorial gear portion provided to a top end portion of the other end portion thereof, the driving unit comprises an air cylinder, and the gear portion engages with a rack fitted to a piston rod of the air cylinder.

According to a fourth aspect of the present invention, there is provided a magnetic recording medium winding apparatus as set forth in first aspect, further comprising a strain gauge as the strain sensing unit fitted to a substantially center portion of the arm member, wherein a strain signal of the arm member, which is sensed by the strain gauge, is amplified by an amplifier and then input into the control unit.

According to a fifth aspect of the present invention, there is provided a magnetic recording medium winding method, comprising steps of: preparing an arm member rotatably supporting a pushing roller at one end side thereof and supported turnably around the other end side thereof; rolling up an original roll of the magnetic recording medium; turning the arm member to push the pushing roller against the original roll of magnetic recording medium at a predetermined set pressure while rolling up the original roll; sensing a strain generated in the arm member during a pushing of the pushing roller; calculating a pressure of the pushing roller against the original roll of magnetic recording medium based on the strain of the arm member; and feedback-controlling the turning of the arm member such that the calculated pressure coincides with the set pressure.

According to this magnetic recording medium winding apparatus, when the magnetic recording medium is wound on the original roll of magnetic recording medium, the pushing roller is pushed against the original roll of magnetic recording medium by the driving unit via the arm member, and then the strain in the arm member caused at this time is sensed by the strain sensing unit and fed back to the control unit. The pressure of the pushing roller is calculated from the sensed strain by virtue of the reduction in the control unit, and then the driving unit is feedback-controlled by comparing this pressure with the set pressure set to the driving unit such that both pressures coincide with each other. Therefore, the pressure control can be carried out with high precision.

Also, if the correlation between the strain and the pressure of the pushing roller is detected previously experimentally, the pressure of the pushing roller is calculated from the strain by virtue of the reduction. Thus, the sensing of the pressure to the original roll of magnetic recording medium during the winding, which was not possible until now, can be achieved. In addition, the pressure calculated based on the strain sensed in this manner contains all error factors such as the fitting methods of the driving unit, the arm member, etc. Thus, if the above correlation is sensed previously every winding apparatus, the original roll of magnetic recording medium can always be wound at the constant pressure by the different winding apparatus.

DETAILED DESCRIPTION OF THE PREFERRED EMBODIMENTS

Figure 1:
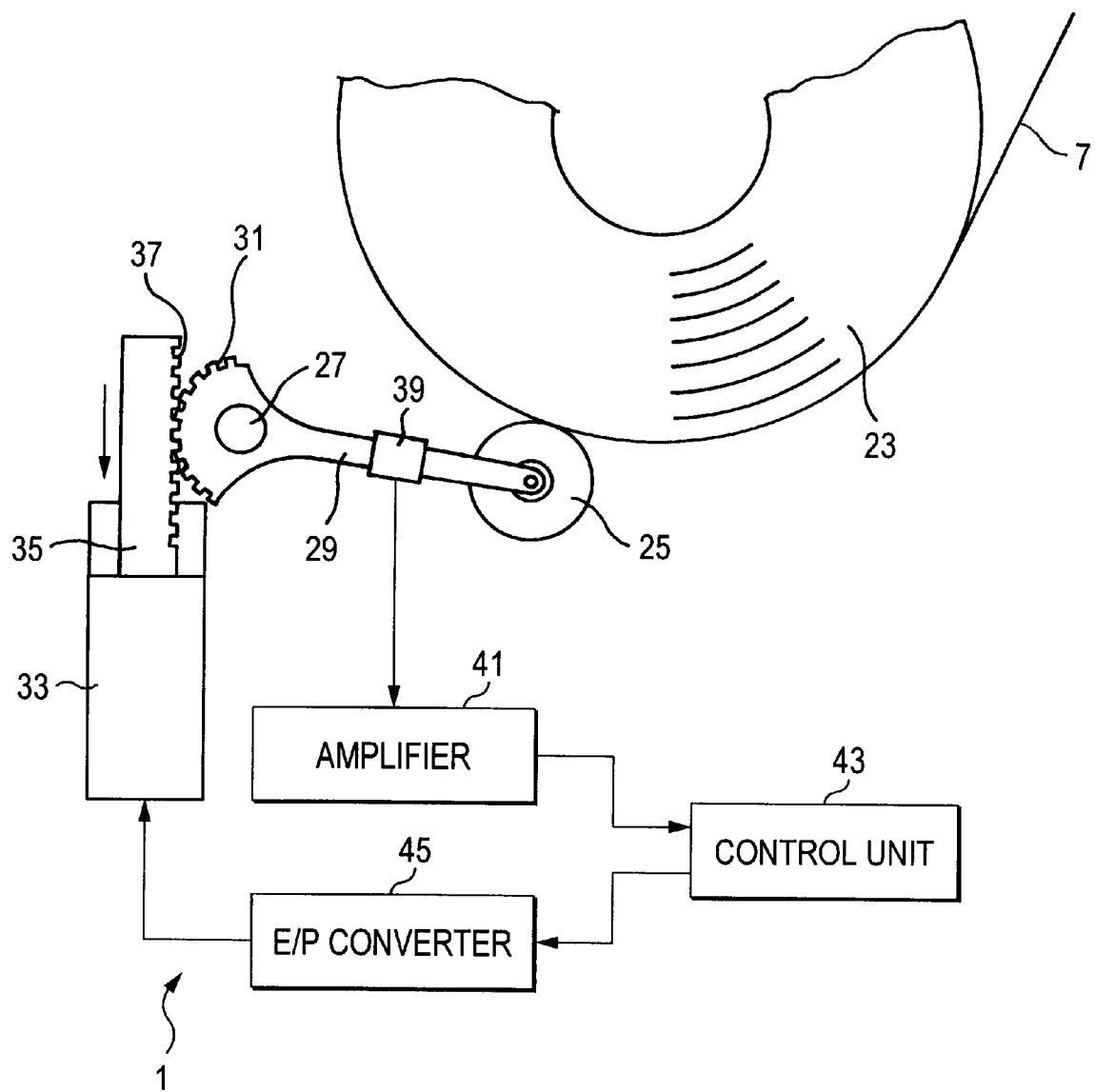
FIG. 1 is an enlarged view showing a configuration of a magnetic recording medium winding apparatus according to the present invention.

A preferred embodiment of the present invention will be explained in detail with reference to the drawings hereinafter. FIG. 1 is an enlarged view showing a configuration of a magnetic recording medium winding apparatus 1 according to the present invention. This magnetic recording medium winding apparatus 1 has a pushing roller 25 that comes into contact with an outer periphery of an original roll of magnetic recording medium 23, on which a magnetic recording medium 7 is wounded, to push the magnetic recording medium 7 at the contact position. This pushing roller 25 is fitted rotatably to a top end of one end portion (the right side in FIG. 1) of an arm member 29. This arm member 29 is supported turnably around a rotary shaft 27 provided to the other end portion.

Also, a sectorial gear portion 31 is provided to a top end portion of the other end portion of the arm member 29. This gear portion 31 engages with a rack 37 that is fitted to a piston rod 35 of an air cylinder 33 as an example of a driving unit. Then, a strain gauge 39 as a strain sensing unit is fitted to an almost center portion of the arm member 29 to sense the strain that is generated in the arm member 29. In this case, it is preferable that the strain gauge 39 should be fitted to the position at which the maximum stress is caused in the arm member 29, but such strain gauge 39 may be fitted to other portion.

The strain gauge 39 is connected to a control unit 43 via an amplifier 41. A strain signal of the arm member 29, which is sensed by the strain gauge 39, is amplified by the amplifier 41 and then input into the control unit 43. The control unit 43 is connected to the air cylinder 33 via an E/P (electric/pressure) converter 45, and converts a command signal issued from the control unit 43 into the pressure to control the air cylinder 33.

The magnetic recording medium winding apparatus 1 having the above configuration is operated as follows. In other words, the control unit 43 sends a command to the air cylinder 33 such that the pushing roller 25 can be pushed against the original roll of magnetic recording medium 23 at a predetermined pressure, and causes the piston rod 35 to move forwardly or backwardly. Then, the rack 37 follows the operation of the piston rod 35, and causes the arm member 29 to turn counterclockwise, as shown in FIG. 1, by the cooperation with the gear portion 31 of the arm member 29. Thus, the pushing roller 25 is pushed against the outer periphery of the original roll of magnetic recording medium 23. The strain of the arm member 29 generated by the pushing pressure at this time is sensed by the strain gauge 39. A sensed signal of this strain is amplified by the amplifier 41 and then input into the control unit 43. The control unit 43 calculates the pushing pressure (sensed pressure value), at which the pushing roller 25 pushes actually the original roll of magnetic recording medium 23 during the winding of the magnetic recording medium 7, based on the input sensed signal, then compares this sensed pressure value with the commanded set pressure value, and then feedback-control the air cylinder 33 to mate the sensed pressure value with the set pressure value. That is, the set pressure value is adjusted such that the sensed pressure value coincides with the set pressure value, and then is fed back to the air cylinder 33 to control the pushing pressure of the pushing roller into a desired pressure.

Therefore, the pushing roller 25 can always be pushed against the original roll of magnetic recording medium 23 at the precise set pressure. In particular, the thin magnetic recording medium whose pressure setting is delicate can also be wound stably not to cause the failure.

Figure 2:
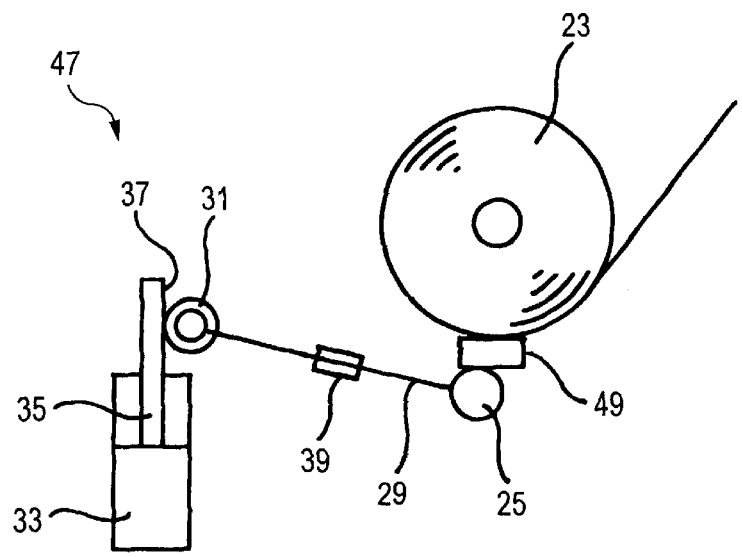
FIG. 2 is a configurative view showing a schematic system for sensing a pushing pressure of a pushing roller in a stationary state and a strain of an arm member.

Here, a relationship between the pushing pressure of the pushing roller 25 against the original roll of magnetic recording medium 23 in the stationary state and the strain generated in the arm member 29 is compared. More particularly, as shown in FIG. 2, a load cell 49 is interposed between an outer periphery of the original roll of magnetic recording medium 23 and the pushing roller 25 to sense the pressure for the original roll of magnetic recording medium 23 and also sense the strain generated from the strain gauge 39 in the arm member 29, and then these sensed results are compared mutually.

Figure 3:
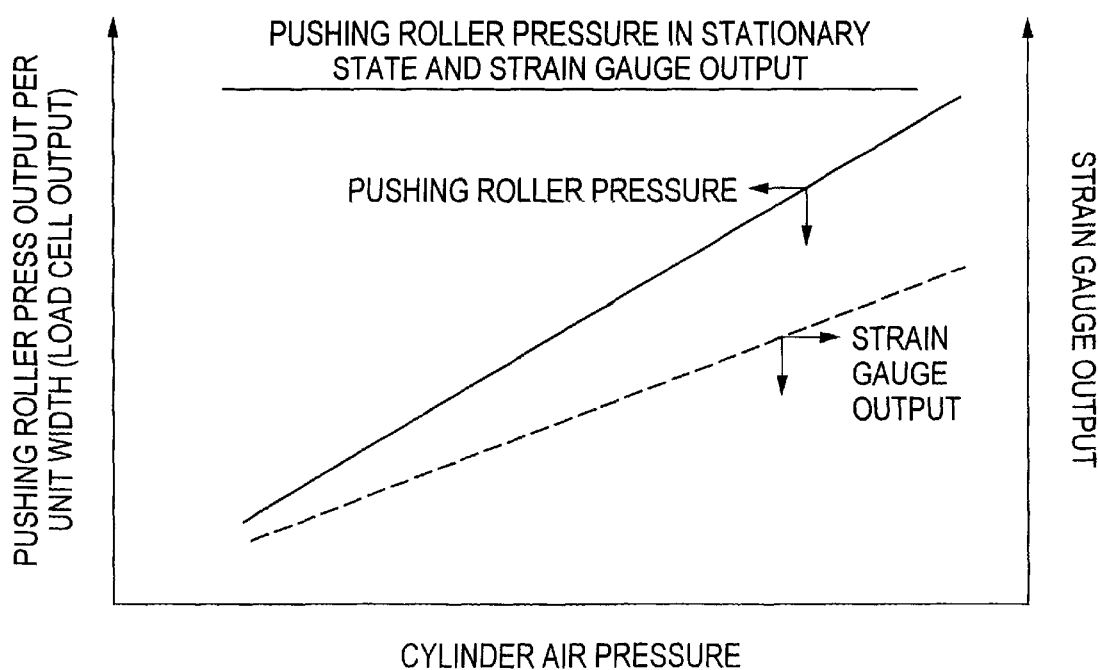
FIG. 3 is a graph showing a relationship between the pressure by the pushing roller in the stationary state and a sensed signal of a strain gauge.

The relationship between the pressure of the pushing roller 25 sensed by the load cell 49 in the stationary state of the original roll of magnetic recording medium 23 and the sensed signal of the strain gauge 39 is shown in FIG. 3. As shown in FIG. 3, it is understood that both the actual pushing pressure by the pushing roller 25 and the sensed signal of the strain gauge 39 have a good proportional relationship with the air pressure of the air cylinder 33, and the pressure by the pushing roller 25 can be calculated based on the output of the strain gauge 39 with high precision.

Figure 4:
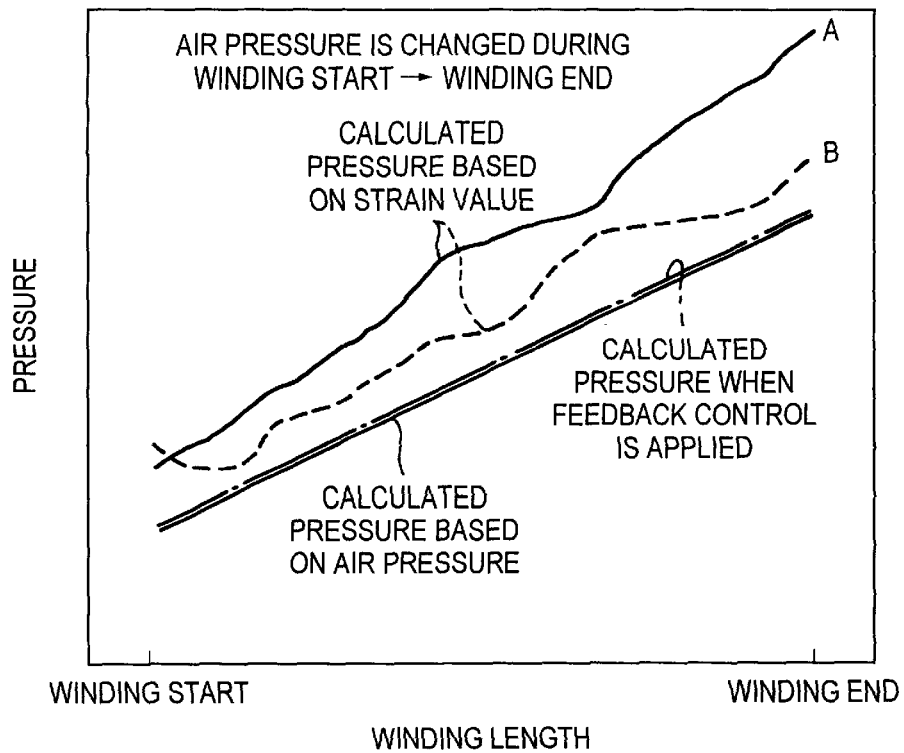
FIG. 4 is a graph showing changes in the pushing pressure of the pushing roller from a winding start to a winding end when the same original roll of magnetic recording medium is wound by using two different magnetic recording medium winding apparatuses A, B.

FIG. 4 is a graph showing changes in the pushing pressure of the pushing roller 25 from a winding start to a winding end when the same original roll of magnetic recording medium 23 is wound by using two different magnetic recording medium winding apparatuses A, B. If the air pressure of the air cylinder 33 is increased gradually from the winding start, the pressure of the pushing roller 25 calculated based on the air pressure is gradually increased.

The pressure of the pushing roller 25, which is calculated based on the strain of the arm member 29, is shifted into the higher pressure side than the pressure, which is calculated based on the air pressure of the air cylinder 33, in two actual magnetic recording medium winding apparatuses A, B, and also the pressure changing patterns are different in respective apparatuses A, B. The reasons for this may be considered such that a positional relationship between the piston rod 35 in the air cylinder 33 and a cylinder inner wall during the winding is changed in response to a winding diameter of the original roll of magnetic recording medium 23 and therefore the pressure is superposed onto the pressure of the pushing roller 25 due to the difference in the sliding resistance, the assembling mechanical precision of the apparatuses A, B, the machining precision and the fitting precision of the gear portions 31, 37, etc. when the piston rod 35 is slid along the cylinder inner wall.

In contrast, the pressure change caused when the feedback control is applied coincides substantially with the pressure change that is calculated based on the air pressure. Thus, it can be seen that the pressure in the feedback control is controlled to the set pressure with high precision.

Figure 5:
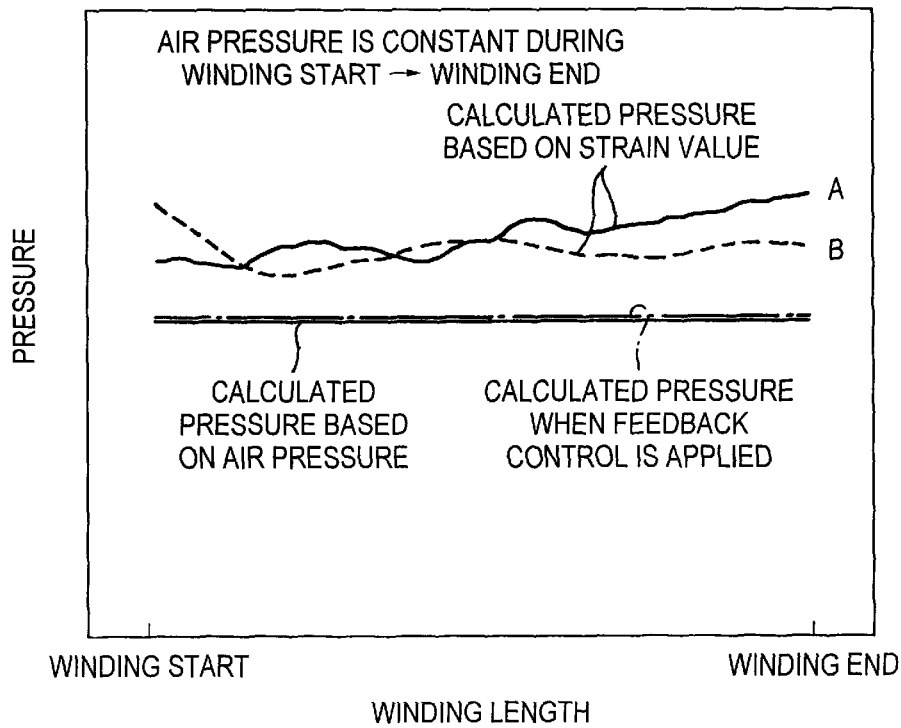
FIG. 5 is a graph showing changes in the pushing pressure of the pushing roller from the winding start to the winding end when the same original roll of magnetic recording medium is wound by using two different magnetic recording medium winding apparatuses A, B while maintaining an air pressure of an air cylinder constant.
Figure 6:
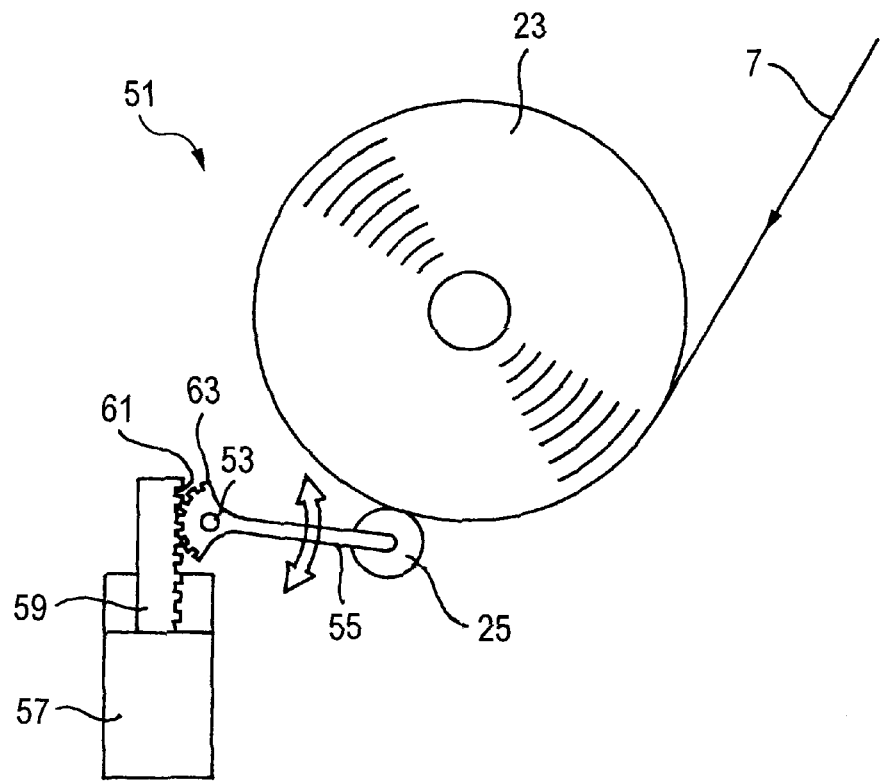
FIG. 6 is a configurative view showing the magnetic recording medium winding apparatus in the prior art.
Figure 7:
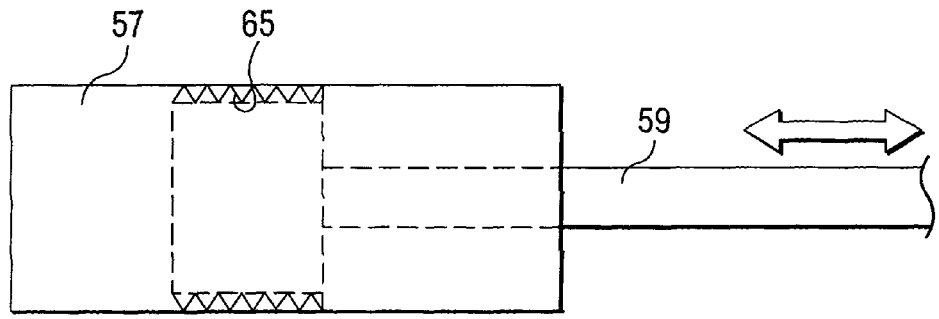
FIG. 7 is an explanatory view showing a behavior of a sliding resistance between a piston rod and the air cylinder.

While, FIG. 5 is a graph showing changes in the pushing pressure of the pushing roller 25 from the winding start to the winding end when the same original roll of magnetic recording medium 23 is wound by using two different magnetic recording medium winding apparatuses A, B while maintaining the air pressure of the air cylinder 33 constant. It is of course that the pressure of the pushing roller 25, which is calculated based on the air pressure, becomes constant.

The pressure of the pushing roller 25, which is calculated based on the strain of the arm member 29, is shifted into the higher pressure side than the pressure, which is calculated based on the air pressure of the air cylinder 33, in the actual magnetic recording medium winding apparatuses A, B, and also the pressure changing patterns are different in respective apparatuses A, B. This reason may also be considered such that the pressure is superposed on the pressure of the pushing roller 25 by the similar reason to the case in FIG. 4.

In contrast, the pressure change caused when the feedback control is applied coincides substantially with the pressure change that is calculated based on the air pressure. Thus, it can be understood that the pressure in the feedback control is controlled to the set pressure with high precision.

According to above results, since the pushing pressure of the pushing roller 25 against the original roll of magnetic recording medium 23 is calculated based on the strain in the arm member 29 to which the pushing roller 25 is fitted, the actual pressure during the winding can be sensed precisely. Then, the actual pressure of the pushing roller 25 can be mated with the designated set pressure with high precision by feedback-controlling the sensed pressure to the air cylinder 33. As a result, the thin magnetic recording medium 7, whose pressure setting is delicate, can also be wound stably without the failure.

Also, if the relationship between the pressure of the pushing roller 25 calculated based on the strain of the arm member 29 and the pressure of the pushing roller 25 calculated based on the air pressure applied to the air cylinder 33 is stored every magnetic recording medium winding apparatus 1, the winding operation can always be carried out under the constant pressure with high precision irrespective of the differences in the sliding resistance in the air cylinder 33 of the winding apparatus 1, the mechanical precision in fitting the driving gears, etc. As a result, even when a plurality of magnetic recording medium winding apparatuses 1 are operated, the winding operation can be carried out with high constant quality in each winding apparatus 1.

In this case, the present invention is not limited to the above embodiment, and thus appropriate variation, improvement, etc. can be applied. For example, the air cylinder 33 as a driving unit for driving the piston rod 35 is employed. But such driving unit is not limited to this, and other fluid-pressure cylinder, the motor, etc. may be employed.

Also, the strain gauge as a strain sensing unit is not limited to the paste type gauge. The combination of the load cell and the strain gauge may be employed, and the optical displacement meter such as the laser length measuring machine, etc. may be employed.

In addition, the arm member 29 for supporting the pushing roller 25 is turned around the rotation shaft 27 to push the pushing roller 25, which is fitted to the top end, against the original roll of magnetic recording medium 23. But the arm member 29 is not limited to such structure. The arm member 29 may be directly fitted to the piston rod 35 of the air cylinder 33, and then the pressure of the pushing roller 25 may be detected by sensing the strain caused by the compression of the arm member 29.

According to the magnetic recording medium winding apparatus of the present invention, when the pushing roller supported by the arm member is pushed against the magnetic recording medium, the strain caused in the arm member is sensed by the strain sensing unit and then is fed back to the control unit. Therefore, the pressure control can be carried out with high precision, and thus particularly the thin magnetic recording medium, whose pressure setting is fine, can be wound stably in high quality.

What is claimed is:

1. A magnetic recording medium winding apparatus for rolling up an original roll of the magnetic recording medium, comprising:

an arm member rotatably supporting a pushing roller at one end side thereof and supported turnably around the other end side thereof;

a driving unit turning the arm member to push the pushing roller against the original roll of magnetic recording medium at a predetermined set pressure while rolling up the original roll;

a strain sensing unit sensing a strain generated in the arm member during a pushing by the driving unit; and a control unit calculating a pressure of the pushing roller against the original roll of magnetic recording medium based on a sensed signal of the strain sensing unit and also feedback-controlling the driving unit such that the calculated pressure coincides with the set pressure at the driving unit.

2. The magnetic recording medium winding apparatus as set forth in claim 1, wherein the magnetic recording medium is magnetic tape.

3. The magnetic recording medium winding apparatus as set forth in claim 1, wherein the arm member comprises a sectorial gear portion provided to a top end portion of the other end side thereof, the driving unit comprises an air cylinder, and the gear portion engages with a rack fitted to a piston rod of the air cylinder.

4. The magnetic recording medium winding apparatus as set forth in claim 1, further comprising a strain gauge as the strain sensing unit fitted to a substantially center portion of the arm member, wherein a strain signal of the arm member, which is sensed by the strain gauge, is amplified by an amplifier and then input into the control unit.

5. A magnetic recording medium winding method, comprising steps of:

preparing an arm member rotatably supporting a pushing roller at one end side thereof and supported turnably around the other end side thereof;

rolling up an original roll of the magnetic recording medium;

turning the arm member to push the pushing roller against the original roll of magnetic recording medium at a predetermined set pressure while rolling up the original roll;

sensing a strain generated in the arm member during a pushing of the pushing roller;

calculating a pressure of the pushing roller against the original roll of magnetic recording medium based on the strain of the arm member; and feedback-controlling the turning of the arm member such that the calculated pressure coincides with the set pressure.

* * * * *